(12) United States Patent
Markham

(10) Patent No.: US 7,021,337 B2
(45) Date of Patent: Apr. 4, 2006

(54) PLUMBING TEST PLUG AND METHOD

(76) Inventor: Allen R. Markham, 3932 Jester Dr., Murray, UT (US) 84123

( * ) Notice: Subject to any disclaimer, the term of this patent is extended or adjusted under 35 U.S.C. 154(b) by 0 days.

(21) Appl. No.: 11/065,221

(22) Filed: Feb. 24, 2005

(65) Prior Publication Data
US 2005/0189027 A1    Sep. 1, 2005

Related U.S. Application Data

(60) Provisional application No. 60/548,135, filed on Feb. 27, 2004.

(51) Int. Cl.
*F16L 55/10* (2006.01)
(52) U.S. Cl. .......................... 138/90; 138/93
(58) Field of Classification Search ............... 138/90, 138/93, 94, 94.5, 89; 73/40.5 R, 49.1, 49.5
See application file for complete search history.

(56) References Cited

U.S. PATENT DOCUMENTS

| | | | |
|---|---|---|---|
| 2,930,396 A * | 3/1960 | Weisman et al. ........... 137/357 |
| 3,564,103 A * | 2/1971 | Brachschob et al. .......... 373/82 |
| 4,122,869 A * | 10/1978 | Roberson, Sr. .............. 138/93 |
| 4,203,473 A * | 5/1980 | Roberson, Sr. .............. 138/93 |
| 4,460,019 A | 7/1984 | Condon |
| 4,492,095 A * | 1/1985 | Brister ........................ 62/293 |
| 4,608,858 A | 9/1986 | McKinnon |
| 4,658,861 A | 4/1987 | Roberson, Sr. |
| 5,076,095 A * | 12/1991 | Erhardt ....................... 73/49.8 |
| 5,163,480 A * | 11/1992 | Huber .......................... 138/94 |
| 5,353,841 A | 10/1994 | Mathison et al. |
| 5,439,032 A * | 8/1995 | Petrone ....................... 138/93 |
| 5,771,937 A | 6/1998 | Collins |
| 6,116,286 A | 9/2000 | Hooper et al. |
| 6,289,935 B1 | 9/2001 | Tash |
| 6,351,985 B1 * | 3/2002 | Bedwell ...................... 73/49.8 |
| 6,390,118 B1 | 5/2002 | Mankins |
| 6,502,603 B1 | 1/2003 | Lane, Jr. |
| 6,516,832 B1 * | 2/2003 | Myers .......................... 138/93 |
| 6,564,823 B1 | 5/2003 | Mankins |

\* cited by examiner

*Primary Examiner*—James Hook
(74) *Attorney, Agent, or Firm*—Marcus G. Theodore

(57) ABSTRACT

An improved screw in test plug covering the opening of a test plug opening adapted to removably secure inflatable test balls thereto for inflation therein for water column pressure testing, and deflation for release of the water before removal of the test plug and test ball from the plumbing system.

11 Claims, 3 Drawing Sheets

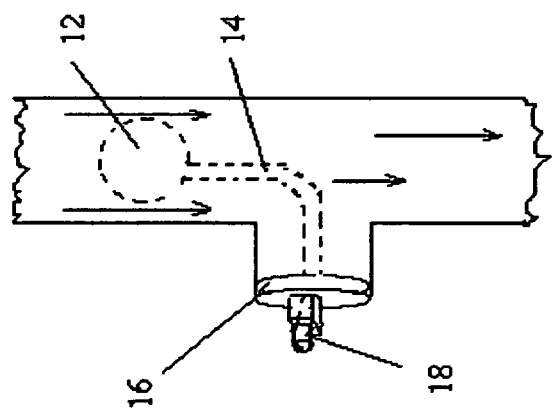
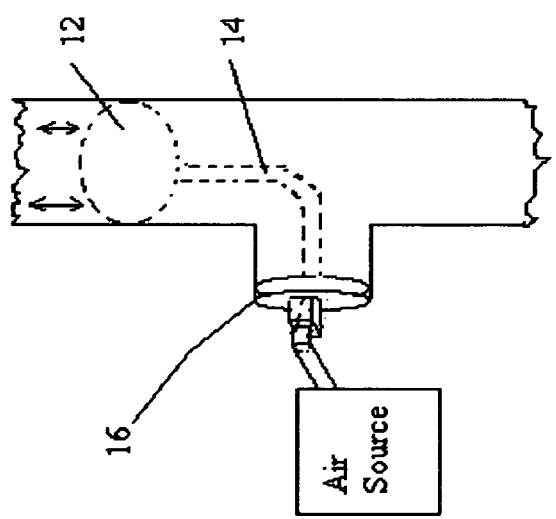
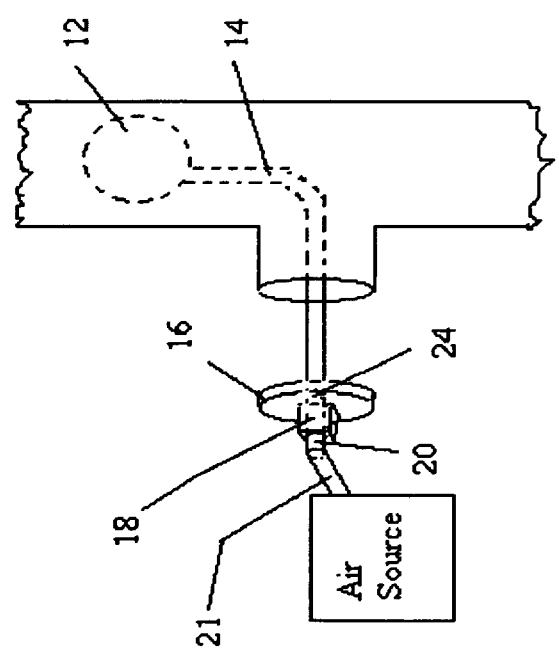

US 7,021,337 B2

PLUMBING TEST PLUG AND METHOD

RELATED APPLICATIONS

This application is a continuation-in-part of the provisional patent application entitled "Improved Test Plug System filed Feb. 27, 2004, Ser. No. 60/548,135

BACKGROUND OF THE INVENTION

1. Field

This invention pertains to plumbing test systems and methods. In particular it pertains to an improved test plug covering the opening of a test plug opening adapted to removably secure inflatable test balls thereto for inflation therein for water column pressure testing, and deflation for release of the water before removal of the test plug and test ball from the plumbing system.

2. State of the Art

A number of inflatable test balls are known, such as Condon, U.S. Pat. No. 4,460,019 dated Jul. 17, 1984, which has a stop cap at the end of the inflation hose to prevent the device from being flushed or sucked down the sewer connection pipe (Col. 6, lines 5–15). This device is particularly suited for positioning an inflatable test ball in a desired position within a pipe system before inflating. Other test plug assemblies are: Roberson, Sr., U.S. Pat. No. 4,658,861 dated Apr. 21, 1987; Mathison et al., U.S. Pat. No. 5,353,841 dated Oct. 11, 1994; Lane, Jr., U.S. Pat. No. 6,502,603 B2 dated Jan. 7, 2003; Collins, U.S. Pat. No. 5,771,937 dated Jun. 30, 1998; Mankins, U.S. Pat. No. 6,564,823 B1 dated May 20, 1993; Mankins, U.S. Pat. No. 6,390,118B1 dated May 21, 2002; Tash, U.S. Pat. No. 6,289,935 B1 dated Sep. 18, 2001; Hooper et al., U.S. Pat. No. 6,116,286 dated Sep. 12, 2000; and McKinnon, U.S. Pat. No. 4,608,858 dated Sep. 2, 1986. These test plug assemblies have various advantages and disadvantages.

The present invention is designed for usage with an inflatable test ball system attached to an air hose for positioning within a desired section of a pipe. It provides a test plug system, which prevents water damage from accidental release of water pressure columns leaking through a test plug when the test ball is deflated or gives way.

SUMMARY OF THE INVENTION

The invention present comprises a plumbing test plug and method for use with an inflatable test ball attached to an air hose. The test plug is attached to the hose of an inflatable test ball, which is inserted through a test plug opening to selectively position the test ball to plug lower portions of plumbing systems. The test plug is then screwed into the test plug opening and the ball inflated to block a segment of the plumbing system, which is then filled with a column of water to check the upper portion for leaks. Thereafter, the test ball is deflated allowing the water to drain through the lower portion of the plumbing system passing by the covered test plug opening without spilling there through, and the test plug is unscrewed and removed. The advantage of the present device is that it provides a test plug with a universal adapter for use with different types of inflatable test balls. It has a rotating coupling to attach to an air hose to prevent the test plug from twisting the hose when the test plug is screwed in. Also, the device allows water to drain through the lower portion of the plumbing system without leaking through the test plug opening.

The invention comprises threaded test plug sized to screw within the threaded opening of a test plug inspection portal. It has a rotating coupling with one end adapted to attach to an air hose segment attached to the test ball. The coupling is rotatably secured to and passes through the test plug. It has an extension segment adapted to attach to the end of an air hose via a Schrader or universal type of air inflation valve on the outside of the test plug. After the test ball and hose are secured to the end of the test plug, the test plug is screwed into the test plug inspection portal, and the extension segment is attached to an air source for inflation or deflation of the test ball.

The test plug may be employed with a plurality of test balls positioned within designated branches of a plumbing system and then attached to the rotating coupling end for separate testing of desired segments of a plumbing system.

The plug is used by removing the cap of the test plug, inserting the test ball and its air hose into plumbing system and securing the test plug into the test plug opening as discussed below. The test ball is then inflated after insertion to block the segment of the pipe system to be tested, which is then filled with water. After the plumbing seals are checked, the inflated test ball is deflated by releasing air through the stem of the Shrader valve to deflate the test ball allowing the backed up water to pass there around and into the lower segment of the plumbing system. The test plug is then unscrewed and the device removed and the test plug cap screwed back in to seal the plumbing system.

The invention thus prevents blowout or release water from passing through the test plug into the interior area causing water damage.

DESCRIPTION OF THE DRAWINGS

FIG. 3A is a perspective view of the test plug associated with an tube connected to a test ball.

FIG. 3B is a perspective view of the embodiment shown in FIG. 2A with the test plug secured within an inspection portal.

FIG. 3C is a perspective view of the embodiment shown in FIG. 2A in an insertion or removal position.

DESCRIPTION OF THE ILLUSTRATED EMBODIMENTS

Figure 1:
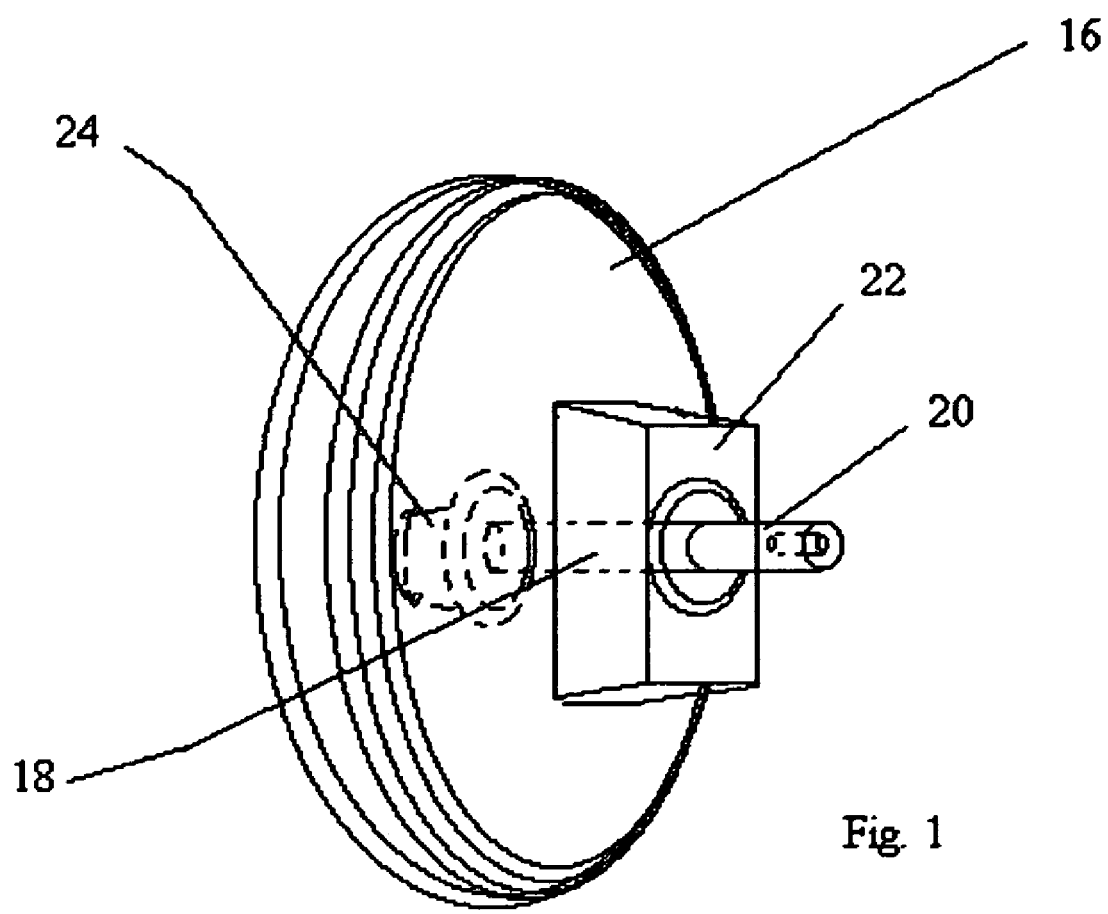
FIG. 1 is a perspective view of a preferred embodiment of a test plug.

The present invention 10 is adapted for use with inflatable test balls 12 permanently or removably attached to air ball hoses. The preferred embodiment shown in FIG. 1 comprises a plumbing test plug 16 for use with an inflatable test ball 12 attached to an air ball hose 14 shown in the other figures. The test plug 16 is threaded, sized, and adapted to removably screw into and seal a test plug inspection portal shown in FIG. 2 after its inspection portal screw cap 11 is removed. It has a universal rotating coupling 18 with first and second ends 20, 24 rotatably attached to and passing through the raised lug attachment structure 22 on the surface of the test plug. The attachment structure 22 is shaped for grasping by a tool to aid in screwing and unscrewing the test plug 16 to form a water tight seal. The rotatable coupling 18 has a first end 20 shown as a Schrader valve secured outside the plumbing system when the test plug 16 is screwed into and covers the inspection portal. This first end 20 is adapted to removably attach to an air hose 21 coupling associated with a selectively activated pressurized air source.

The second end 24 is adapted to attach to the air ball hose 14 of the test ball 12, which are then secured inside the inspection portal. The rotating coupling 18 prevents the test plug 16 from twisting the air ball hose 14 and the air source hose 19 when the test plug 16 is screwed into place.

The inflatable test ball 12 is attached via the air ball hose 14 to the second end 24 of the rotating coupling 18. This inflatable test ball 12 is sized to fit within a plumbing circuit in its deflated state, with an inflated diameter sufficient to contact and form a liquid blocking seal with the interior walls of the plumbing pipes to be tested. Where varying diameter pipes are encountered, appropriate different sized test balls 12 are employed. Hence the need for a universal rotating coupling 18 designed for use with universal connections to accommodate the air ball hoses 14 of these different sized test balls 12.

Figure 2C:
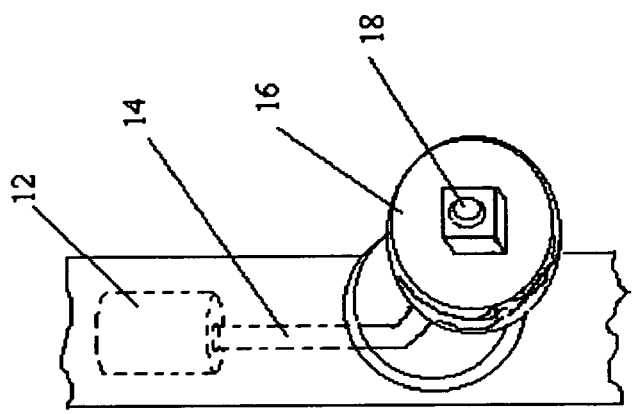
FIG. 2C is a side view of the preferred embodiment shown in FIG. 1B with the test ball in a deflated position.
Figure 2B:
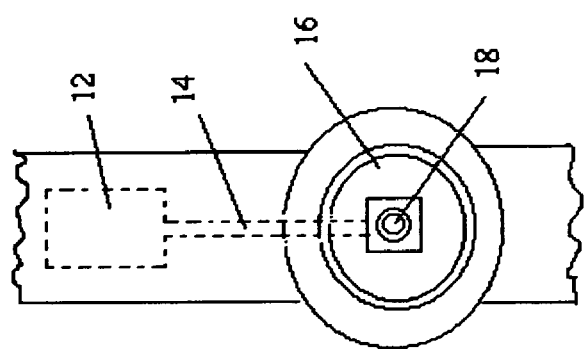
FIG. 2B is a perspective view of the preferred embodiment shown in FIG. 1A in a secured position with the test ball in an inflated position.
Figure 2A:
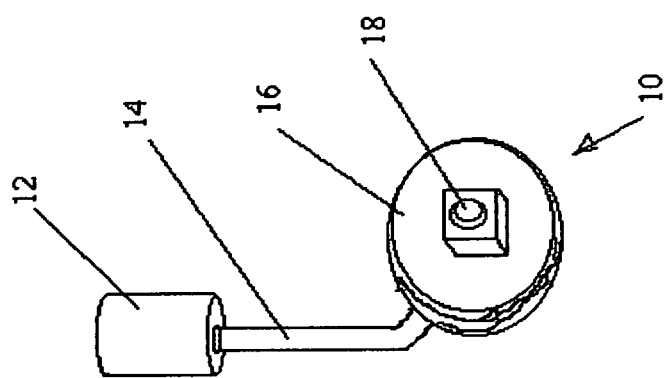
FIG. 2A is a perspective view of a preferred embodiment attached to an air source.
Figure 2:
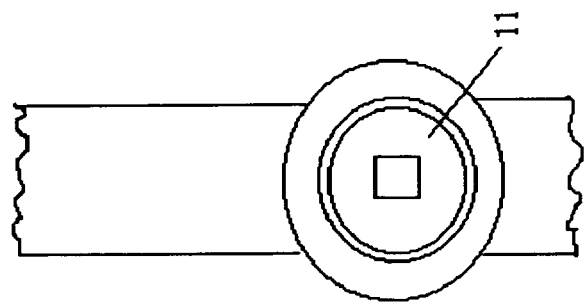
FIG. 2 is a front view of a typical test plug inspection portal.

The positioning and removal of the test plug 16 system 10 is shown in the attached drawings FIGS. 2A, 2B, and 2C. FIG. 2A is a perspective view of the test plug 16 associated with an air ball hose 14 connected to a test ball 12. The test plug 16 system 10 components are first connected to the test plug 16 by attaching the air ball hose 14 of the air ball 12 to the rotating coupling 18.

FIG. 2B is a perspective view of the embodiment shown in FIG. 2A with the test plug 16 system 10 secured in position. FIG. 2B shows the test plug 16 system 10 screwed into the test plug portal after inserting the test ball and its air hose into the segment of the plumbing system to be tested.

FIG. 2C is a perspective view of the embodiment shown in FIG. 2A in an insertion or removal position. After completion of the test, the test plug 16 is unscrewed from the test plug portal and the test plug 16 system 10 components are then removed.

FIGS. 3A, 3B, and 3C show the method of using the test plug 16 system 10. FIG. 3A shows how the first end 20 of the rotating coupling 18 is attached to the hose 21 of an air source, preferably via a Schrader valve 20. The second end 24 of the rotating coupling 18 passing through the test plug 16 is then attached to the air ball hose 14 of the inflatable test ball 12. The assembled unit then has the deflated test ball 12 inserted through a test plug portal into the desired position to be tested (if required different length air ball hoses 14 are employed where needed). FIG. 3B shows how the test plug 16 is then sealed within the test portal and the test ball 12 is inflated to plug a desired portion of the plumbing system for leak testing. The segment of the plumbing system above the inflated test ball 12 is then filled with a column of water to check the upper portion for leaks. After the test is completed, as shown in FIG. 3C, the test ball 12 is deflated allowing the water to drain past it and into and through the lower portion of the plumbing system. The test plug 16 system 10 is then unscrewed and removed and the test portal cap restored.

The advantage of the present device is that it has a universal Shrader type hose adapter for use with different types of air hoses 21, and the air ball hoses 14 of inflatable test balls 12. The rotating coupling 18 prevents the hoses 14, 21 from twisting when the test plug 10 is screwed into and unscrewed from the test plug portal. Also, the device 10 allows water to drain through the lower portion of the plumbing system without leaking out the test plug opening. Preferably the test plug 16 is made of a lightweight nylon or plastic material compatible with the test plug pipe to provide a light-weight testing system.

The test plug 16 system 10 may be employed with a branched air ball hose 14 with different length segments attached to a plurality of test balls 12 to position them within multiple designated branches of a plumbing system to be tested.

Although this specification has referred to the illustrated embodiments, it is not intended to restrict the scope of the appended claims. The claims themselves recite those features deemed essential to the invention.

I claim:

1. A plumbing test plug for use with a threaded test plug inspection portal of a plumbing system comprising:
    a) a threaded test plug sized and adapted to removably screw into and form a water tight seal with the test plug inspection portal, including raised attachment structure on the surface of the test plug for grasping by a tool to aid in screwing in the test plug, and
    b) a rotating coupling with rotating first and second ends sealed to and passing through the test plug and attachment structure to expose the rotating ends, with a first end secured outside the plumbing system when the test plug covers the inspection portal adapted to removably attach to an air hose coupling associated with a selectively activated pressurized air source, and an inside second end adapted to attach to a test air ball hose, which prevents the test plug from twisting the hoses when the test plug is screwed into and removed from the test plug inspection portal.

2. A plumbing test plug for use with a threaded test plug inspection portal of a plumbing system comprising:
    a) a threaded test plug sized and adapted to removably screw into and seal the test plug inspection portal with raised attachment structure on the surface of the test plug for grasping by a tool to aid in screwing in the test plug,
    b) a rotating coupling with rotating first and second ends sealed to and passing through the test plug and attachment structure, with a first end secured outside the plumbing system when the test plug covers the inspection portal adapted to removably attach to an air hose coupling associated with a selectively activated pressurized air source, and an inside secured second end adapted to attach to a test air ball hose, which prevents the test plug from twisting the hoses when the test plug is screwed in, and,
    c) an inflatable test ball with a air ball hose attached to the second end of the air hose coupling, which when inserted into a desired segment of a plumbing system is selectively inflated in one mode by the air source to block the desired segment of a plumbing system for filling the segment of the plumbing system above the blocked segment with water or liquid to check for leaks, and deflated in another mode for allowing blocked segments to drain, and for insertion into and removal from the plumbing segment to be tested.

3. A plumbing test plug according to claim 2, including raised attachment structure on the surface of the test plug for grasping by a tool to aid in screwing in the test plug.

4. A plumbing test plug according to claim 3, wherein the raised structure is a cubical shape capable of being grasped by a wrench or pliers.

5. A plumbing test plug according to claim 2, wherein the rotating coupling first end is adapted to attach to the end of an air hose via a Schrader or universal type of air inflation valve on the outside of the test plug.

6. A plumbing test plug according to claim 5, wherein the Schrader valve has a valve stem which may be depressed to release air to deflate the inflated test ball.

7. A plumbing test plug according to claim 6, including a plurality of test balls positioned within designated branches of a plumbing system which is attached to the rotating coupling end for separate testing of different segments of a plumbing system.

8. A plumbing test plug method according to claim 7, wherein the rotating coupling first end is adapted to attach to the end of an air hose via a Schrader or universal type of air inflation valve on the outside of the test plug.

9. A plumbing test plug according to claim 8, wherein the inflated test ball is deflated by detaching the air hose from the air source, and releasing the air from the inflated test ball by depressing the stem of the Schrader valve.

10. A plumbing test plug according to claim 2, wherein the rotating coupling second end is structured as a universal adapter for use with the ball hoses of different types of inflatable test balls.

11. A plumbing test plug method for a plumbing pipe system having an inspection portal covered by a removable screw cap comprising:
   a) removing the screw cap,
   b) screwing into the inspection portal a threaded test plug sized and adapted to screw into and seal a test plug inspection portal, the test plug having a rotating coupling rotatably attached to and passing through the test plug with a first end positioned outside the inspection portal adapted to attach to an air hose coupling removably associated with a selectively activated pressurized air source, and a second end adapted to attach to the air ball hose of an inflatable test ball, said coupling preventing the test plug from twisting the air hose and air ball hose when the test plug is screwed in,
   c) selectively inflating the test ball by activating the air source to block a desired segment of a plumbing system,
   d) filling the segment of the plumbing system above the blocked segment with water or liquid,
   e) checking for the plumbing seals for leaks in the blocked segment of the plumbing system,
   f) deflating the test ball to allow the water or liquid to drain past and into the lower unblocked segment of the plumbing system,
   g) removing the test plug, air hoses and ball from the test plug inspection portal, and
   h) replacing the inspection portal screw cap.

* * * * *